United States Patent
Lin et al.

(10) Patent No.: US 9,564,941 B2
(45) Date of Patent: Feb. 7, 2017

(54) ACCESSORY FOR PROTECTING A PORTABLE ELECTRONIC DEVICE

(71) Applicants: Gloriole Electroptic Technology Corp., Kaohsiung (TW); SHEN ZHEN WONDERWIN TECHNOLOGY CO., LTD., Shen Zhen, Guang Dong Province (CN); TASIN TECHNOLOGY CO., LTD., Guangdong (CN)

(72) Inventors: Jim Lin, Kaohsiung (TW); Danxu Wu, Guangdong (CN)

(73) Assignees: GLORIOLE ELECTROPTIC TECHNOLOGY CORP., Kaohsiung (TW); SHEN ZHEN WONDERWIN TECHNOLOGY CO., LTD., Shen Zhen, Guang Dong Province (CN); TASIN TECHNOLOGY CO., LTD, Guandong (CN)

(*) Notice: Subject to any disclaimer, the term of this patent is extended or adjusted under 35 U.S.C. 154(b) by 0 days.

(21) Appl. No.: 14/328,538

(22) Filed: Jul. 10, 2014

(65) Prior Publication Data

US 2015/0270861 A1 Sep. 24, 2015

(30) Foreign Application Priority Data

Mar. 20, 2014 (TW) .............................. 103204766 U

(51) Int. Cl.
*H04M 1/04* (2006.01)
*H04B 1/3888* (2015.01)
*H04M 1/18* (2006.01)
*H04M 1/02* (2006.01)
*H04M 1/60* (2006.01)
*H04M 1/725* (2006.01)

(52) U.S. Cl.
CPC ............ *H04B 1/3888* (2013.01); *H04M 1/18* (2013.01); *H04M 1/0274* (2013.01); *H04M 1/6058* (2013.01); *H04M 1/72527* (2013.01)

(58) Field of Classification Search
CPC .... G06F 1/6321; G06F 1/1635; H04B 1/3888; H04B 1/3883; H04M 1/04; H04M 1/0274; H04M 1/0262; H04M 1/0283
See application file for complete search history.

(56) References Cited

U.S. PATENT DOCUMENTS

| 7,782,610 | B2 * | 8/2010 | Diebel | G06F 1/1628 361/679.41 |
| 7,948,246 | B2 * | 5/2011 | Agevik | G06F 13/4072 324/691 |

(Continued)

*Primary Examiner* — Bobbak Safaipour
(74) *Attorney, Agent, or Firm* — Muncy, Geissler, Olds & Lowe, P.C.

(57) ABSTRACT

An accessory includes a case body, a cover unit, and first and second coupling units. The case body is formed with a receiving space for receiving a portable electronic device. The cover unit is configured to be coupled removably to the case body for closing and opening the receiving space. The first coupling unit includes a data and charge connector for mating electrical connection with a data and charge socket of the portable electronic device, and a data and charge port connected to the data and charge connector. The second coupling unit includes a connector jack for mating electrical connection with an audio socket of the portable electronic device, and an audio port connected to the connector jack.

5 Claims, 8 Drawing Sheets

(56) References Cited

U.S. PATENT DOCUMENTS

| | | | | |
|---|---|---|---|---|
| 8,553,408 B2* | 10/2013 | Supran | ................. | G06F 1/1632 |
| | | | | 361/679.02 |
| 8,971,039 B2* | 3/2015 | Huang | ................ | H01M 2/1022 |
| | | | | 361/679.41 |
| 2006/0229108 A1* | 10/2006 | Cehelnik | ........... | H04M 1/72522 |
| | | | | 455/569.1 |
| 2008/0164770 A1* | 7/2008 | Terlizzi | ................. | B21C 23/18 |
| | | | | 307/125 |
| 2012/0212063 A1* | 8/2012 | Terlizzi | ................. | H04M 1/05 |
| | | | | 307/80 |
| 2013/0052956 A1* | 2/2013 | McKell | ................... | H04R 1/02 |
| | | | | 455/41.2 |
| 2013/0281169 A1* | 10/2013 | Coverstone | ......... | H04M 19/048 |
| | | | | 455/575.8 |
| 2014/0066138 A1* | 3/2014 | Kim | ................... | H04M 1/0274 |
| | | | | 455/575.1 |
| 2014/0321048 A1* | 10/2014 | Kupferstein | .......... | G06F 1/1632 |
| | | | | 361/679.41 |
| 2015/0044966 A1* | 2/2015 | Shultz | .................. | H04B 5/0012 |
| | | | | 455/41.1 |
| 2015/0050963 A1* | 2/2015 | Rokusek | ................ | G06F 1/266 |
| | | | | 455/566 |

* cited by examiner

US 9,564,941 B2

ACCESSORY FOR PROTECTING A PORTABLE ELECTRONIC DEVICE

CROSS-REFERENCE TO RELATED APPLICATION

This application claims priority of Taiwanese Application No. 103204766, filed on Mar. 20, 2014.

BACKGROUND OF THE INVENTION

1. Field of the Invention

The invention relates to an accessory for protecting a portable electronic device.

2. Description of the Related Art

It is common for a user of a conventional portable electronic device (e.g., a mobile phone) to have a protective case wrapped around the conventional portable electronic device in order to minimize damage attributed to external impact. The protective case is typically formed with through holes for exposing a data and charge socket, and an audio socket of the conventional portable electronic device. In this way, the conventional portable electronic device can be connected to a data and charge connector and/or an audio output device while disposed in the protective case. However, a wide variety of different sizes/designs exist for the conventional portable electronic device, and the sockets may be disposed at different locations. As a result, various protective cases with different designs (e.g., different locations of the through holes) must be made in order to accommodate the different sizes/designs of the conventional portable electronic device.

SUMMARY OF THE INVENTION

Therefore, the object of the present invention is to provide an accessory that is capable of providing protection to the portable electronic devices having a variety of sizes/designs.

Accordingly, an accessory of the present invention is for protecting a portable electronic device. The portable electronic device includes a display screen, a data and charge socket and an audio socket. The accessory comprises a case body, a cover unit, a first coupling unit and a second coupling unit.

The case body is formed with a receiving space for receiving the portable electronic device, a window for exposing the display screen of the portable electronic device, and an end opening for passage of the portable electronic device into and out of the receiving space. The cover unit is configured to be coupled removably to the case body for closing and opening the end opening.

The first coupling unit is coupled to the cover unit and includes a data and charge connector configured for mating electrical connection with the data and charge socket of the portable electronic device, and a data and charge port disposed on the cover unit and connected electrically to the data and charge connector.

The second coupling unit is coupled to the cover unit and includes a connector jack configured for mating electrical connection with the audio socket of the portable electronic device, and an audio port disposed on the cover unit and connected electrically to the connector jack.

BRIEF DESCRIPTION OF THE DRAWINGS

Other features and advantages of the present invention will become apparent in the following detailed description of the preferred embodiments with reference to the accompanying drawings, of which.

Before the present invention is described in greater detail, it should be noted that like elements are denoted by the same reference numerals throughout the disclosure.

DETAILED DESCRIPTION OF THE PREFERRED EMBODIMENTS

Figure 1:
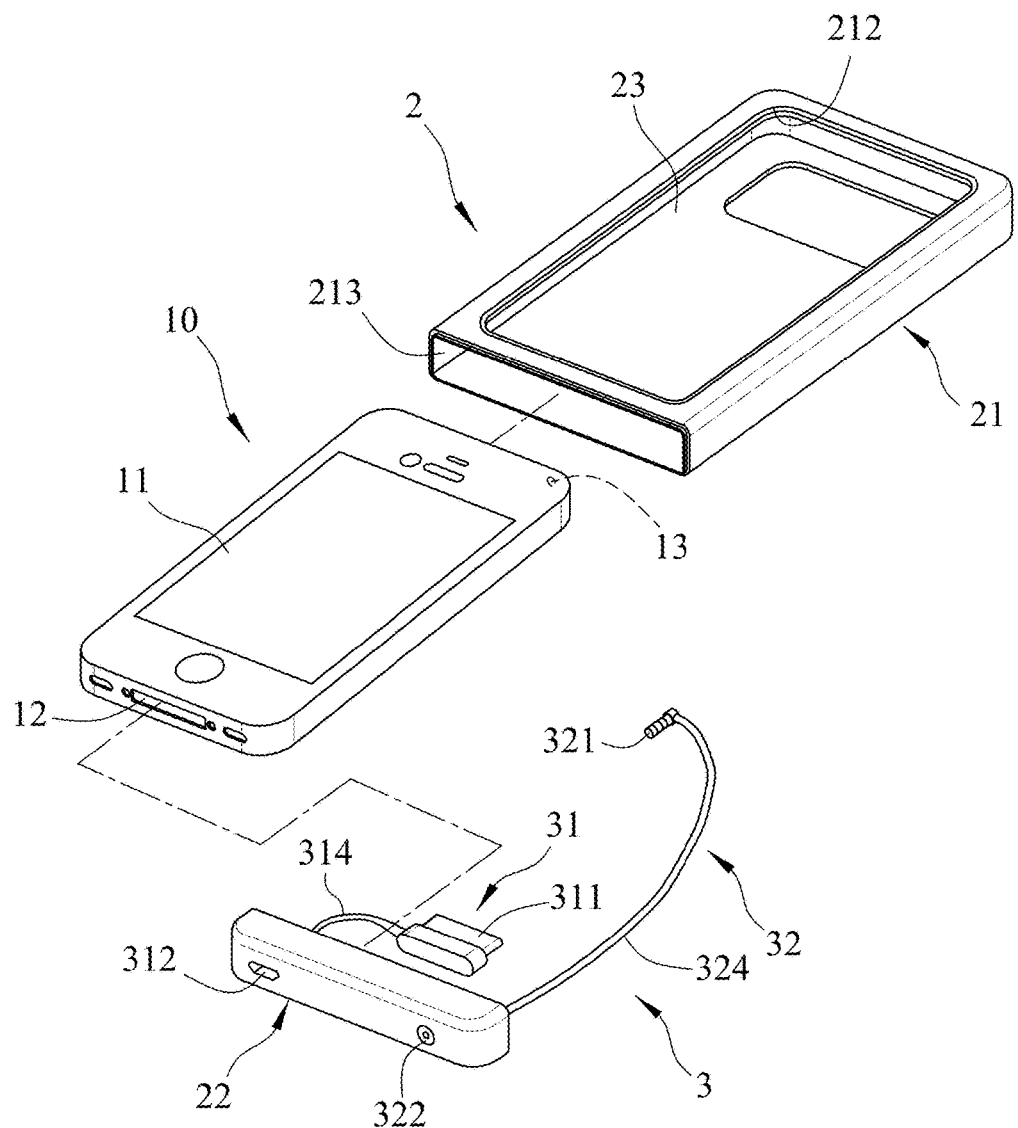
FIG. 1 is an exploded perspective view of the first preferred embodiment of an accessory according to the invention.
Figure 2:
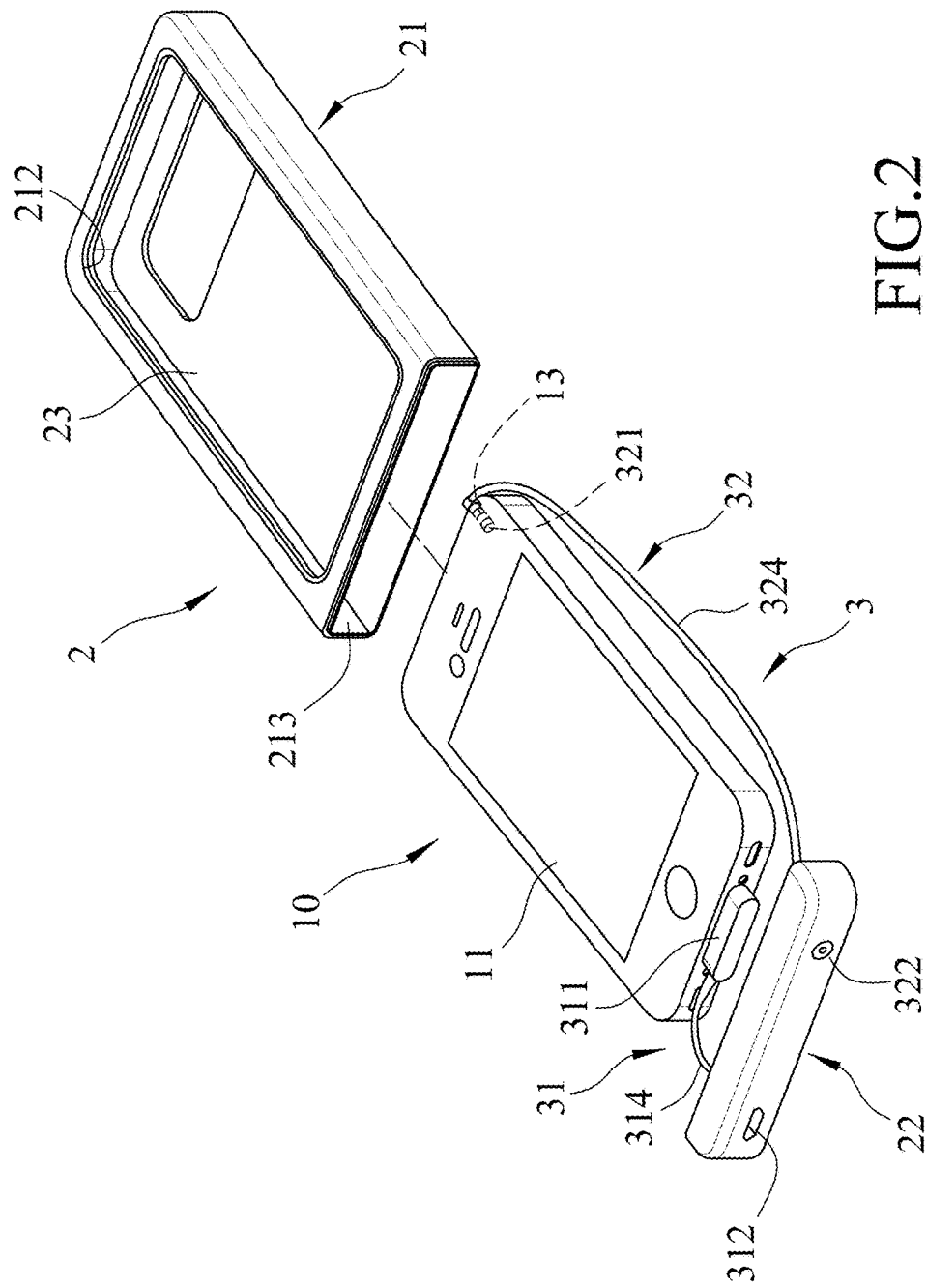
FIG. 2 is an exploded perspective view illustrating a data and charge connector and a connector jack of the first preferred embodiment plugged into a data and charge socket and an audio socket of a portable electronic device, respectively.

As shown in FIGS. 1 and 2, the first preferred embodiment of an accessory according to the present invention is for protecting a portable electronic device 10, such as a mobile phone. The portable electronic device 10 includes a display screen 11, a data and charge socket 12, and an audio socket 13.

The accessory in this embodiment includes a protective case 2 and a connecting assembly 3.

The protective case 2 includes a case body 21 and a cover unit 22.

The case body 21 is formed with a receiving space 23, a window 212 and an end opening 213. The receiving space 23 is for receiving the portable electronic device 10. The window 212, which is a hole in the case body 21 in this embodiment, is for exposing the display screen 11 of the portable electronic device 11. The end opening 213 is for passage of the portable electronic device 10 into and out of the receiving space 23.

The cover unit 22 is configured to be coupled removably to the case body 21 for closing and opening the end opening 213. Specifically, the cover unit 22 is configured to engage fittingly the case body 21 at the end opening 213.

The connecting assembly 3 includes a first coupling unit 31 and a second coupling unit 32.

The first coupling unit 31 is coupled to the cover unit 22 and includes a data and charge connector 311, a data and charge port 312, and a first electrical cord 314.

The data and charge connector 311 is configured for mating electrical connection with the data and charge socket 12 of the portable electronic device 10. The data and charge port 312 is disposed on the cover unit 22 and is connected electrically to the data and charge connector 311. The first electrical cord 314 extends between the data and charge connector 311 and the data and charge port 312 to electrically interconnect the data and charge connector 311 and the data and charge port 312.

The second coupling unit 32 is coupled to the cover unit 22 and includes a connector jack 321, an audio port 322, and a second electrical cord 324.

The connector jack 321 is configured for mating electrical connection with the audio socket 13 of the portable electronic device 10. The audio port 322 is disposed on the cover unit 22 and is connected electrically to the connector jack 321. The second electrical cord 324 extends between the connector jack 321 and the audio port 322 to electrically interconnect the connector jack 321 and the audio port 322.

When it is intended to use the accessory, the data and charge connector 311 is electrically connected to the data and charge socket 12 of the portable electronic device 10, and the connector jack 321 is electrically connected to the audio socket 13. As such, an electrical connection between the data and charge port 312 and the data and charge connector 311, and an electrical connection between the connector jack 321 and the audio port 322 are established (see FIG. 2).

Figure 3:
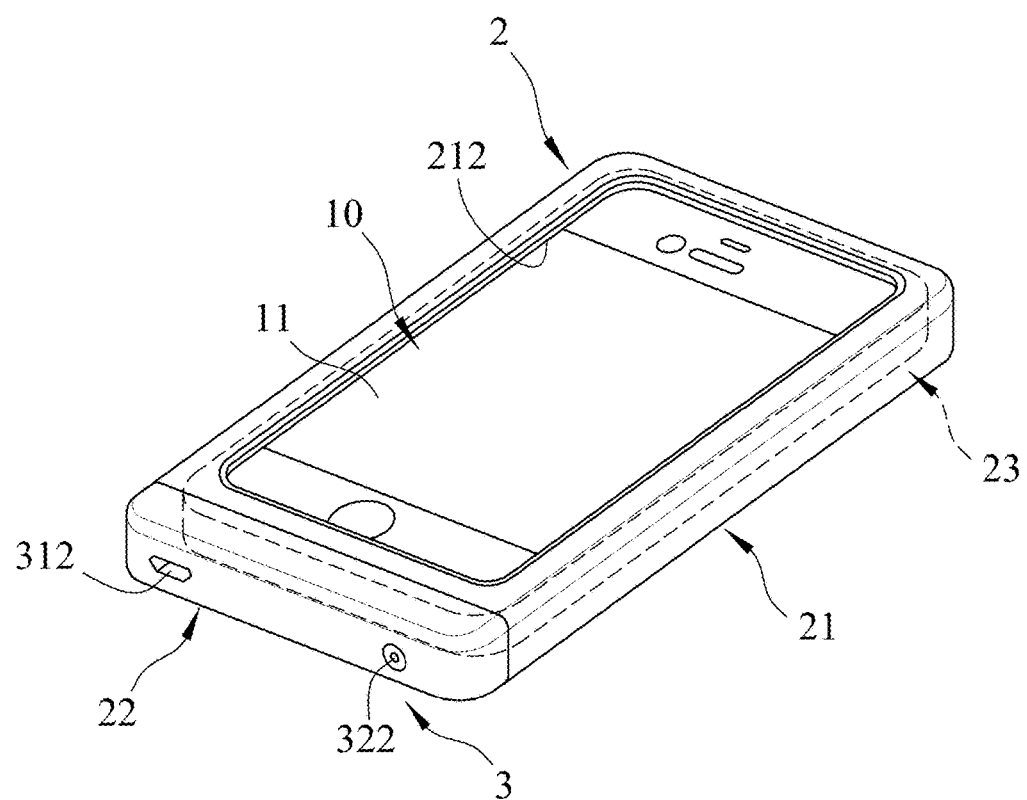
FIG. 3 illustrates the first preferred embodiment installed with the portable electronic device for providing protection to the portable electronic device.

Then, the portable electronic device 10 is inserted into the receiving space 23 through the end opening 213 of the case body 21. Afterward, the cover unit 22 is coupled to the case body 21 so as to retain the portable electronic device 10 in the receiving space 23. In this embodiment, the display screen 11 is exposed via the window 212, the cover unit 22 engages fittingly the case body 21 at the end opening 213, and the first electrical cord 314 and the second electrical cord 324 are disposed in the receiving space 23 (see FIG. 3).

When the accessory of this embodiment is in a state of use, the data and charge socket 12 and the audio socket 13 are able to transmit/receive signals with external connectors (e.g., a data and charge connector, an audio jack, etc.) via the data and charge port 312 and the audio port 322, respectively. This can be achieved regardless of the size of the portable electronic device 10 and/or the locations of the data and charge socket 12 and the audio socket 13 because of the structure/configuration of the first electrical cord 314 and the second electrical cord 324. That is, the accessory of this embodiment can be used with various sizes/designs of portable electronic devices 10. Furthermore, the case body 21 and the cover unit 22 cooperatively protect the portable electronic device 10 from external impact and entry of foreign substances into the data and charge socket 12 or the audio socket 13.

Figure 4:
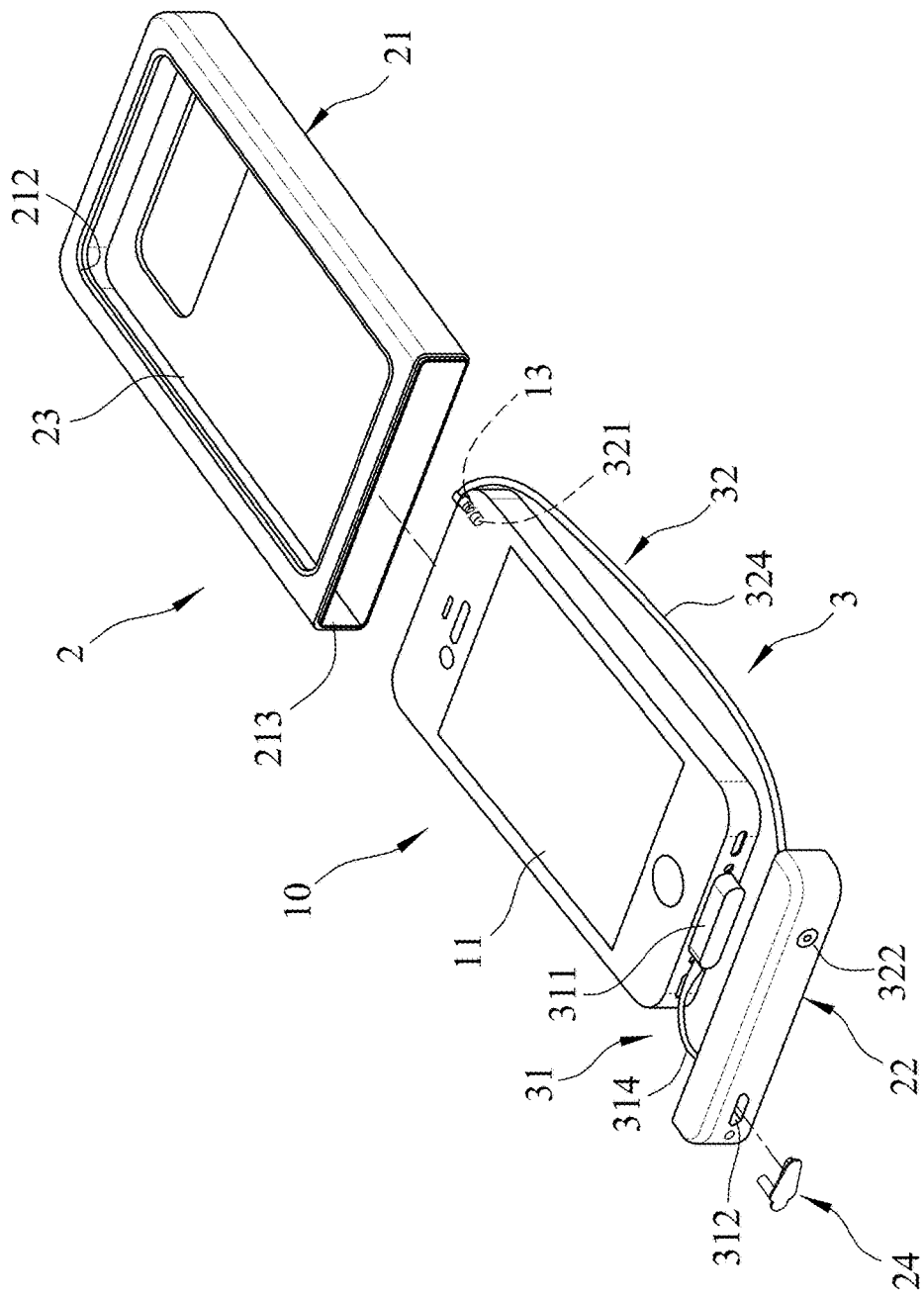
FIG. 4 is an exploded perspective view of a variation of the first preferred embodiment that further includes a protective unit.
Figure 5:
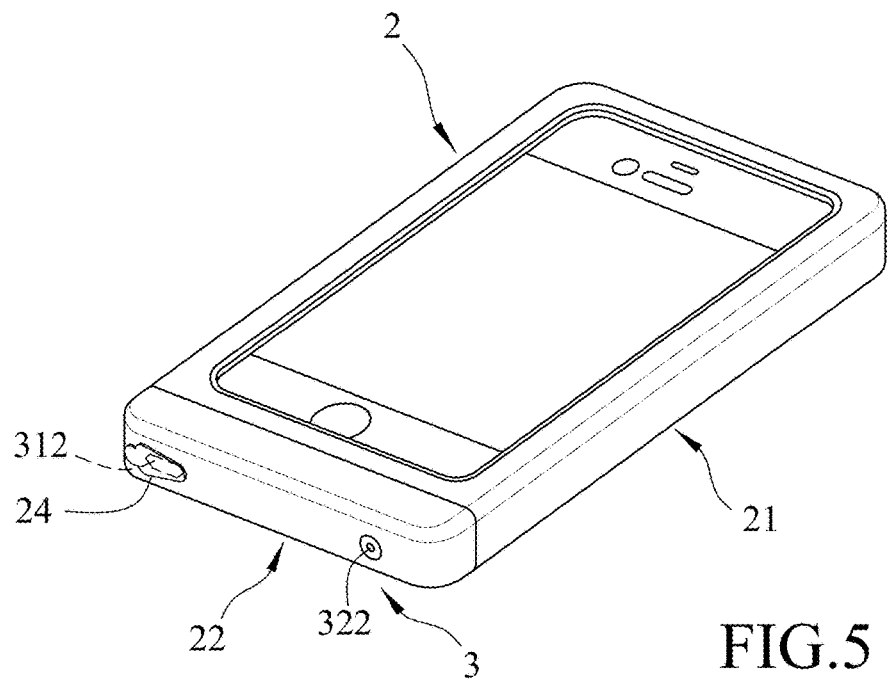
FIGS. 5 and 6 illustrate the protective unit being in a covering position and an uncovering position, respectively.
Figure 6:
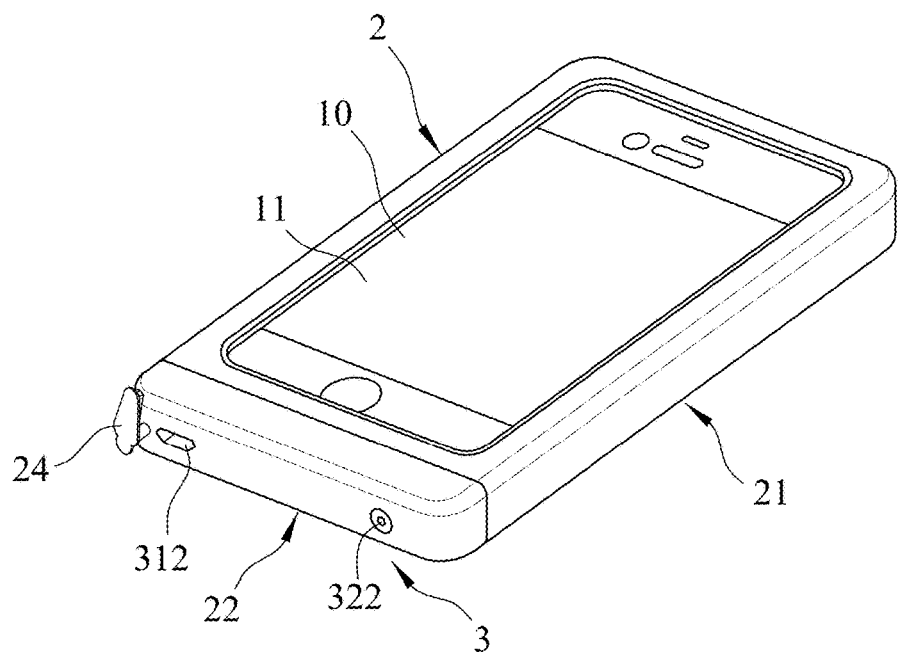

As shown in FIG. 4, in one variation of the first preferred embodiment, the accessory may further comprise a protective unit 24. The protective unit 24 is movably disposed on the cover unit 22, and is movable between a covering position and an uncovering position. In this embodiment, the protective unit 24 is pivoted to the cover unit 22. When it is not intended to use the data and charge socket 12 via the data and charge port 312, the protective unit 24 may be moved to the covering position, in which the protective unit 24 covers the data and charge port 312 (see FIG. 5). On the other hand, when it is intended to use the data and charge socket 12, via the data and charge port 312, the protective unit 24 may be moved to the uncovering position, in which the protective unit 24 uncovers the data and charge port 312 (see FIG. 6).

Figure 7:
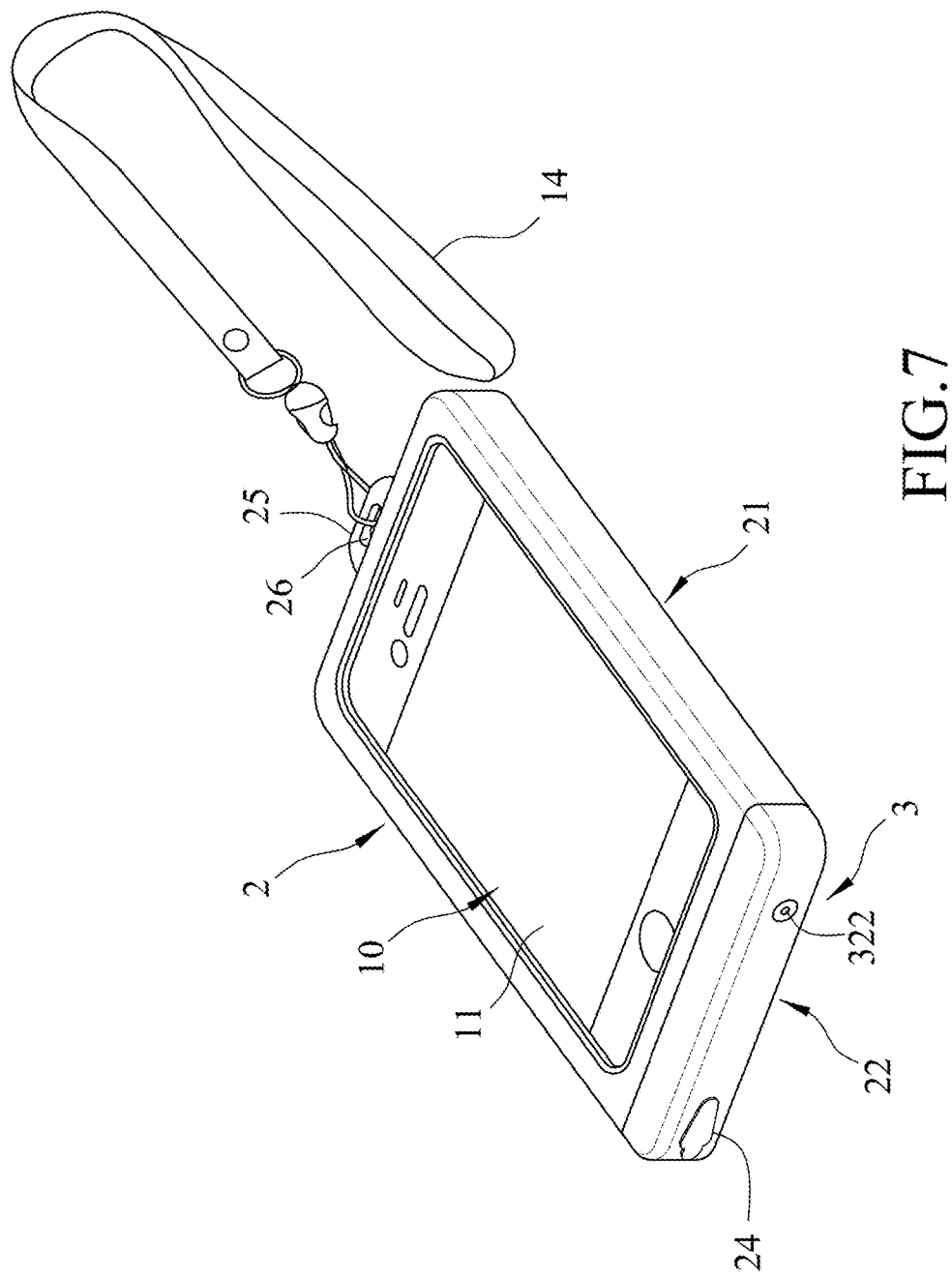
FIG. 7 illustrates a variation of the first preferred embodiment that further includes a hanger component.

As shown in FIG. 7, in another variation of the first preferred embodiment, the accessory may further comprise a hanger component 25 disposed on the case body 21 externally of the receiving space 23. The hanger component 25 is formed with a through hole 26 and allows hanging of at least one additional object on the case body 21. As an example, a strap 14 may be tied to the hanger component 25. The hanger component 25 may be formed as one piece with the case body 21, or may be attached to the case body 21 using any suitable means.

Figure 8:
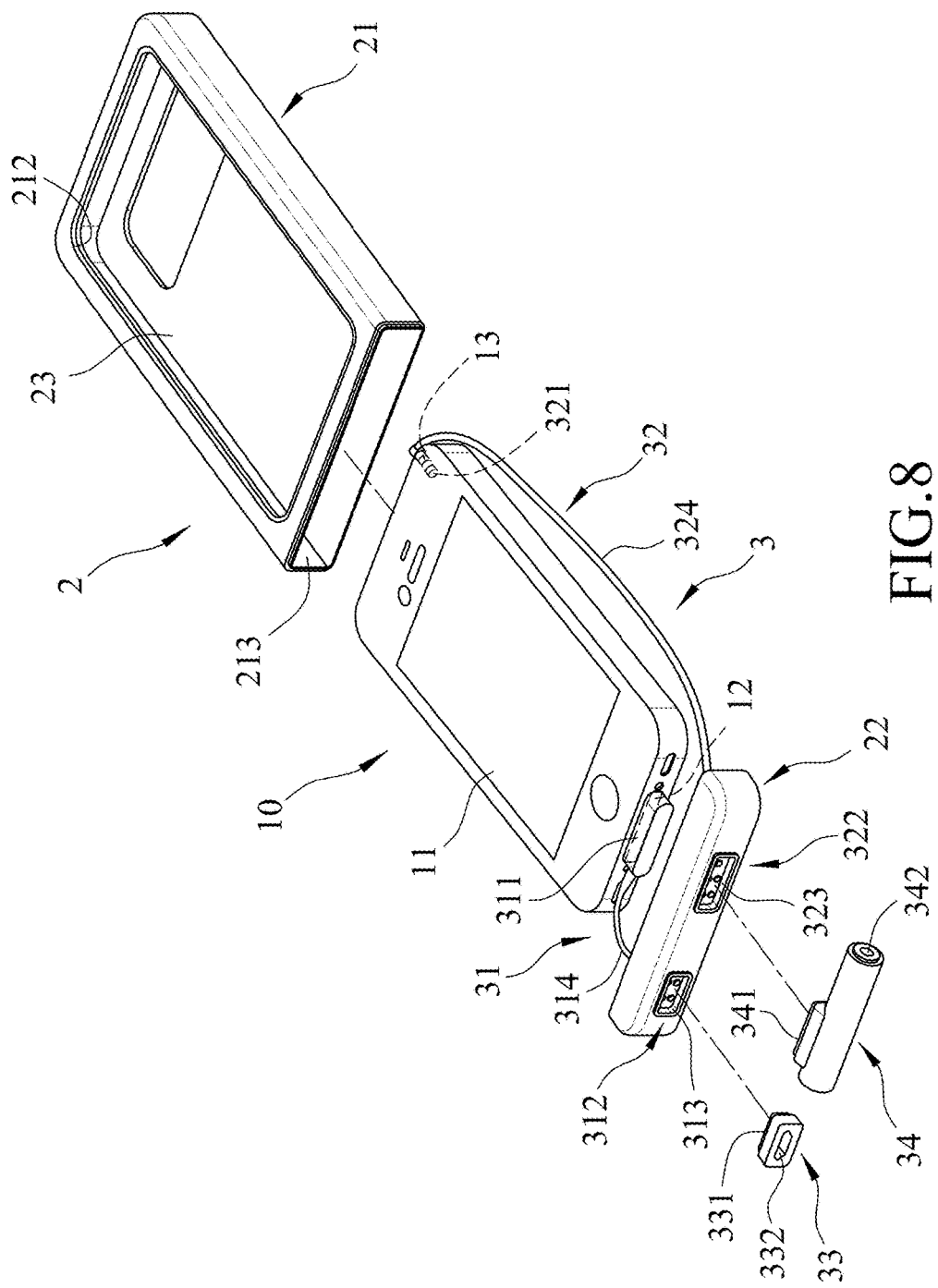
FIG. 8 is an exploded perspective view of the second preferred embodiment of an accessory according to the invention.

As shown in FIG. 8, the second preferred embodiment of the accessory according to the present invention has a structure similar to that of the first embodiment. The main difference between this embodiment and the previous embodiment resides in the configuration of the first coupling unit 31 and the second coupling unit 32.

Specifically, the data and charge port 312 of this embodiment includes an electrical connector 313, and the first coupling unit 31 further includes an adaptor 33.

The adaptor 33 includes a connecting component 331 and an external data and charge port 332. The connecting component 331 is configured to contact electrically the electrical connector 313 and to removably engage the electrical connector 313 by magnetic attraction. The external data and charge port 332 is electrically connected to the connecting component 331.

Electrical connection between the external data and charge port 332 and the data and charge connector 311 is established when the adaptor 33 is attached to the cover unit 22 via engagement between the connecting component 331 and the electrical connector 313.

The audio port 322 of this embodiment includes an electrical connector 323, and the second coupling unit 32 further includes an adaptor 34. The adaptor 34 includes a connecting component 341 and an external audio port 342.

The connecting component 341 configured to contact electrically the electrical connector 323 and to removably engage the electrical connector 323 by magnetic attraction. The external audio port 342 is electrically connected to the connecting component 341.

Electrical connection between the external audio port 342 and the connector jack 321 is established when the adaptor 34 is attached to the cover unit 22 via engagement between the connecting component 341 and the electrical connector 323.

Figure 9:
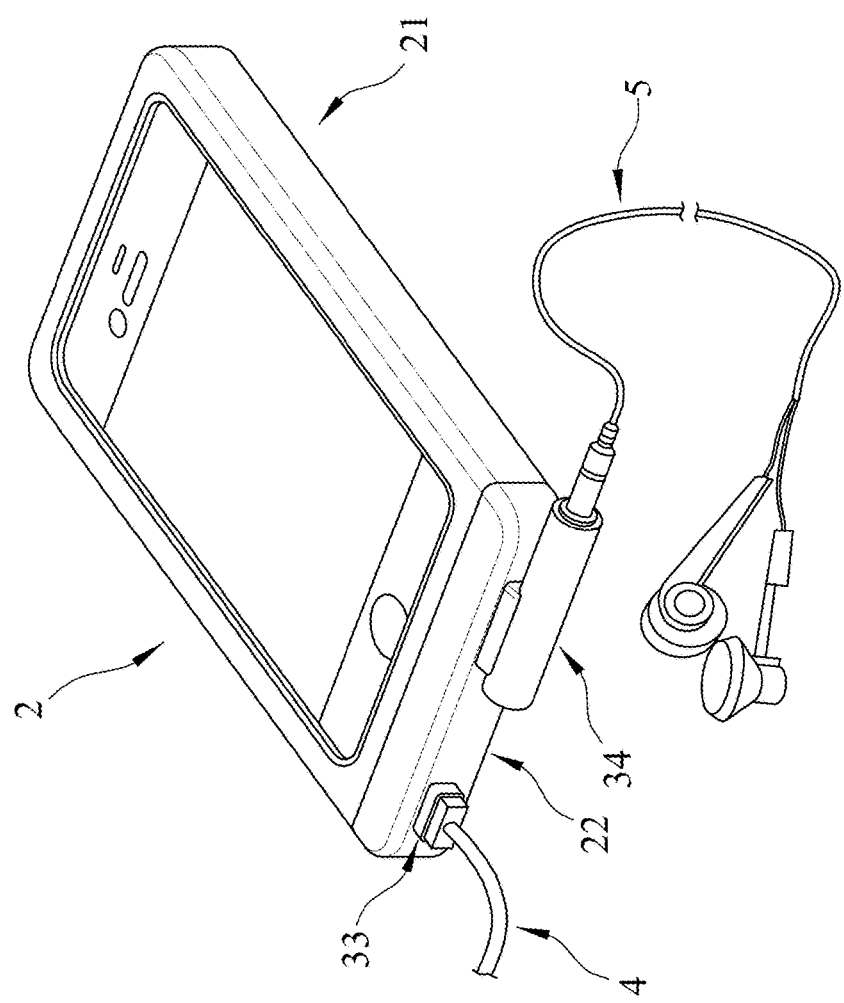
FIG. 9 illustrates the second preferred embodiment installed with the portable electronic device for establishing electrical connections between the portable electronic device and each of a data and charge connector and an audio output device.

After the protective case 2 of this embodiment is installed with the portable electronic device 10 in a manner similar as described in the previous embodiment, the adaptors 33 and 34 are respectively connected to the electrical connectors 313 and 323 using magnetic attraction. As a result, the external data and charge port 332 and the external audio port 342 are available to be used to connect an external data and charge connector 4 and an audio output device 5 to the portable electronic device 10, as best shown in FIG. 9.

It is noted that the accessory of this embodiment also has the advantages of the previous embodiment. That is, the applicability to various portable electronic devices, protection against external impact and prevention of entry of foreign substances.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An accessory for protecting a portable electronic device, the portable electronic device including a display screen, a data and charge socket and an audio socket, said accessory comprising:

a case body formed with a receiving space for receiving the portable electronic device, a window for exposing the display screen of the portable electronic device, and an end opening for passage of the portable electronic device into and out of the receiving space;

a cover unit configured to be coupled removably to said case body for closing and opening said end opening;

a first coupling unit coupled to said cover unit and including
- a data and charge connector configured for mating electrical connection with the data and charge socket of the portable electronic device, and
- a data and charge port disposed on said cover unit and connected electrically to said data and charge connector; and a second coupling unit coupled to said cover unit and including
- a connector jack configured for mating electrical connection with the audio socket of the portable electronic device, and
- an audio port disposed on said cover unit and connected electrically to said connector jack;

wherein:

said first coupling unit further includes a first electrical cord that extends between said data and charge connector and said data and charge port to electrically interconnect said data and charge connector and said data and charge port;

said second coupling unit further includes a second electrical cord that extends between said connector jack and said audio port to electrically interconnect said connector jack and said audio port, said first electrical cord and said second electrical cord are to be disposed in said receiving space;

said data and charge port includes an electrical connector, and said first coupling unit further includes an adaptor that includes
- a connecting component configured to contact electrically said electrical connector and to removably engage said electrical connector by magnetic attraction, and
- an external data and charge port electrically connected to said connecting component; wherein electrical connection between said external data and charge port and said data and charge connector is established when said adaptor is attached to said cover unit via engagement between said connecting component and said electrical connector;

wherein said audio port includes an electrical connector, and said second coupling unit further includes an adaptor that includes:
- a connecting component configured to contact electrically said electrical connector and to removably engage said electrical connector by magnetic attraction; and
- an external audio port electrically connected to said connecting component;

wherein electrical connection between said external audio port and said connector jack is established when said adaptor is attached to said cover unit via engagement between said connecting component and said electrical connector.

2. The accessory of claim 1, wherein said cover unit is configured to engage fittingly said case body at said end opening.

3. The accessory of claim 1, further comprising a protective unit movably disposed on said cover unit and movable between a covering position, where said protective unit covers said data and charge port, and an uncovering position, where said protective unit uncovers said data and charge port.

4. The accessory of claim 1, further comprising a hanger component disposed on said case body externally of said receiving space, said hanger component being formed with a through hole.

5. The accessory of claim 4, wherein said hanger component is formed as one piece with said case body.

* * * * *